United States Patent [19]

Frost et al.

[11] Patent Number: 4,506,763

[45] Date of Patent: Mar. 26, 1985

[54] CONVEYOR AND/OR CHAIN LUBRICATION APPARATUS

[75] Inventors: Charles C. Frost, Ada; Siegfried K. Weis, Byron Center, both of Mich.

[73] Assignee: Conveyor Maintenance & Supply, Inc., Grand Rapids, Mich.

[21] Appl. No.: 389,955

[22] Filed: Jun. 18, 1982

[51] Int. Cl.³ .............................................. F16N 7/00

[52] U.S. Cl. .................................. 184/15.2; 184/6.28; 198/500

[58] Field of Search .................... 184/3.1, 3.2, 6, 6.28, 184/7 R, 15.1, 15.2, 15.3, 27 R, 27 A, 27 C, 27 D, 29, 55 A, 56 R, 56 A; 178/500; 74/99 A, 104, 107, 519

[56] References Cited

U.S. PATENT DOCUMENTS

| | | | |
|---|---|---|---|
| 410,530 | 9/1889 | Beattie | 184/2 |
| 945,782 | 1/1910 | Hall | 184/2 |
| 1,647,924 | 11/1927 | May | 184/15.1 |
| 1,649,348 | 11/1927 | Hunt | 184/15.1 |
| 1,757,954 | 5/1930 | Cuddihy | 184/15.1 |
| 1,788,364 | 1/1931 | Gies | 198/500 |
| 1,840,934 | 1/1932 | Craig et al. | 184/15.1 |
| 1,902,601 | 3/1933 | Warner | 184/15.2 |
| 1,919,451 | 7/1933 | Schaefer | 184/15.2 |
| 1,979,591 | 11/1934 | Warner | 184/15.1 |
| 1,990,408 | 2/1935 | Kerst et al. | 184/2 |
| 2,022,726 | 12/1935 | Leach | 184/15.3 |
| 2,087,601 | 7/1937 | Leach | 184/15.2 |
| 2,293,578 | 8/1942 | Tuhy | 184/15.2 |
| 2,664,969 | 1/1954 | Bjerre | 184/15.1 |
| 2,683,502 | 7/1954 | Schlosshauer | 184/15.1 |
| 2,899,089 | 8/1959 | Ajero | 74/107 X |
| 3,031,033 | 4/1962 | Burrows | 184/15.1 |
| 3,067,837 | 12/1962 | Burrows | 184/15.1 |
| 3,116,810 | 1/1964 | Olson | 184/15.1 |
| 3,248,956 | 5/1966 | Kuhn | 74/519 X |
| 3,425,513 | 2/1969 | Fisher et al. | 184/15.1 X |
| 3,503,470 | 3/1970 | Lister | 184/15.1 |
| 3,543,882 | 12/1970 | Paasche | 184/15.2 |
| 3,599,753 | 8/1971 | Walsh | 184/15.2 |
| 3,610,218 | 10/1971 | Durham | 74/519 X |
| 3,684,059 | 8/1972 | Stoner | 184/15.3 |
| 3,785,456 | 1/1974 | McIntire et al. | 184/15.1 |
| 3,934,600 | 1/1976 | Murphy | 137/625.5 |
| 4,064,970 | 12/1977 | Reeves | 184/15.3 |
| 4,101,002 | 7/1978 | Almasy | 184/15.3 |
| 4,212,372 | 7/1980 | Murphy et al. | 184/15.3 |
| 4,271,930 | 6/1981 | Thomson et al. | 184/15.2 |
| 4,274,509 | 6/1981 | Thomson et al. | 184/15.3 |

FOREIGN PATENT DOCUMENTS

| | | |
|---|---|---|
| 134260 | 9/1949 | Australia . |
| 2332401 | 1/1975 | Fed. Rep. of Germany . |
| 2434132 | 1/1976 | Fed. Rep. of Germany . |
| 2555722 | 5/1977 | Fed. Rep. of Germany . |
| 2920858 | 11/1979 | Fed. Rep. of Germany . |
| 1098592 | 8/1955 | France . |
| 1181702 | 6/1959 | France . |
| 2232187 | 12/1974 | France . |
| 54-151283 | 11/1979 | Japan . |
| 196809 | 5/1923 | United Kingdom . |
| 230353 | 3/1925 | United Kingdom . |
| 368068 | 3/1932 | United Kingdom . |
| 457899 | 12/1936 | United Kingdom . |
| 501378 | 2/1939 | United Kingdom . |
| 613221 | 11/1948 | United Kingdom . |
| 911755 | 11/1962 | United Kingdom . |
| 937154 | 9/1963 | United Kingdom . |
| 1415820 | 11/1975 | United Kingdom . |
| 2020378 | 11/1979 | United Kingdom . |
| 2039793 | 8/1980 | United Kingdom . |
| 698857 | 11/1979 | U.S.S.R. . |

Primary Examiner—David H. Brown
Assistant Examiner—John E. Griffiths
Attorney, Agent, or Firm—Price, Heneveld, Huizenga & Cooper

[57] ABSTRACT

A lubrication apparatus for conveyor equipment and/or chains, especially overhead conveyors and conveyor chains. The apparatus is mounted immediately adjacent a conveyor or chain for proper lubrication of bearing surfaces while the conveyor or chain is moving. Provision is made for pivotal movement of the lubrication apparatus out of the path of the conveyor or chain should a damaged conveyor or chain part contact the apparatus. Preferably, the apparatus includes side arms with internal lubricant passageways and metering pump means therein for dispensing and directing the lubricant. The pump means are actuated by a center arm pivotally mounted between the side arms and biased into engagement with the moving conveyor or chain. The side arms may be pivotally mounted or stationary with respect to the conveyor apparatus or chain. Check-valve nozzles which direct lubricant in a finely divided spray from the side arms are also disclosed.

37 Claims, 15 Drawing Figures

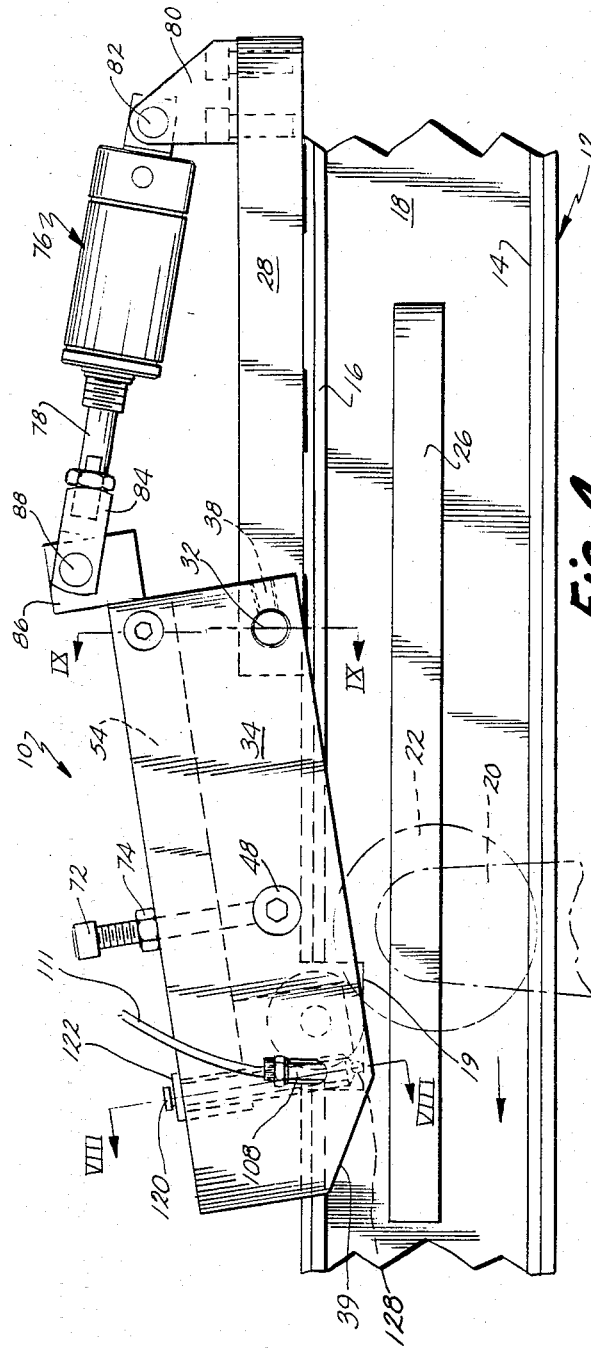
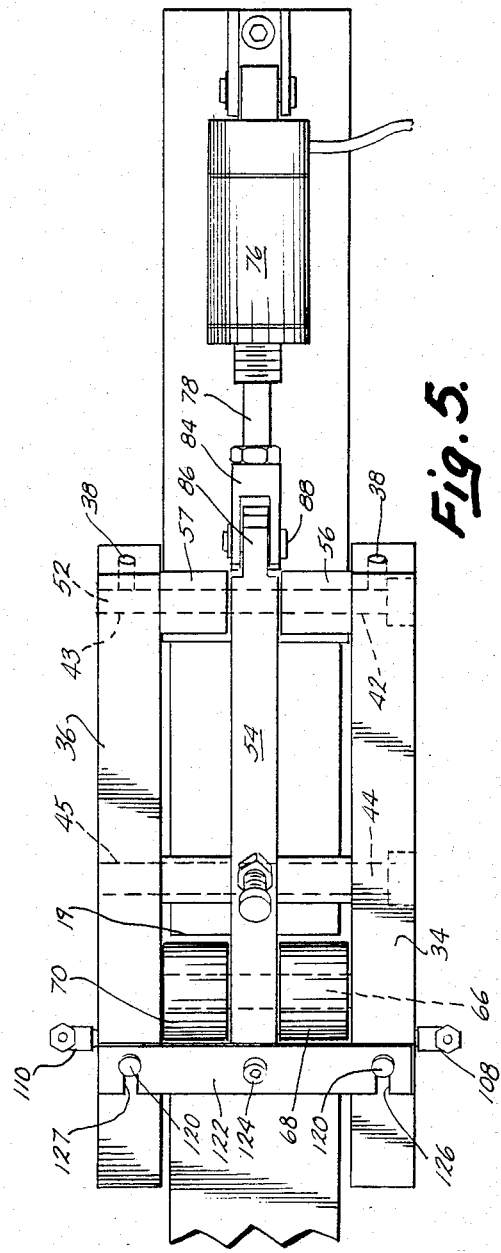

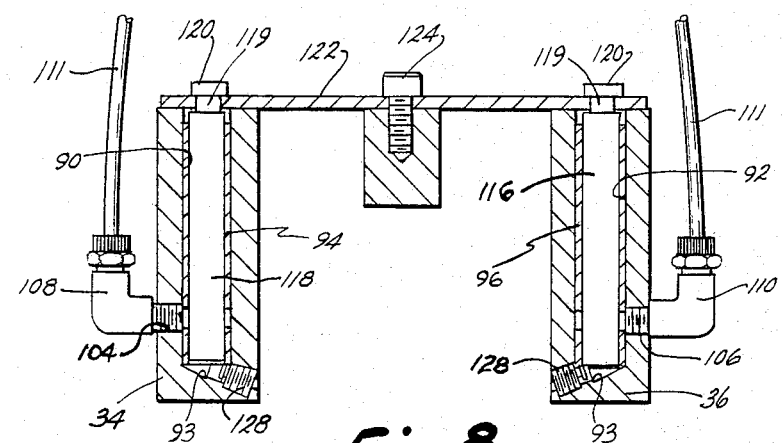
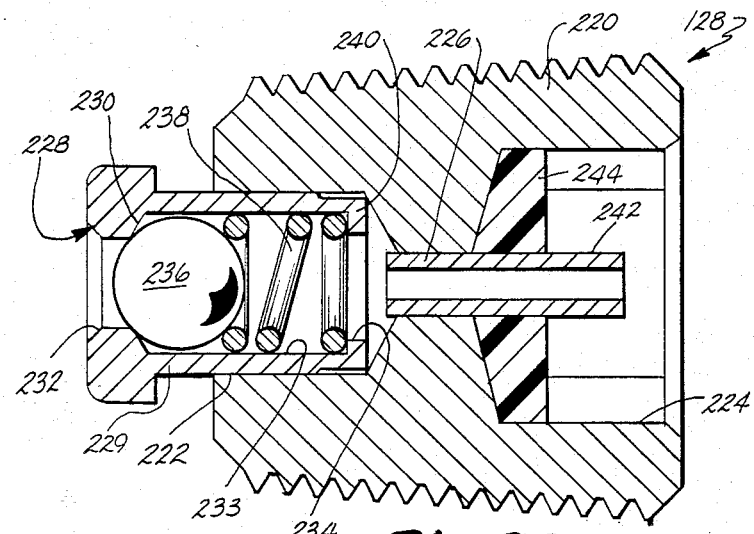
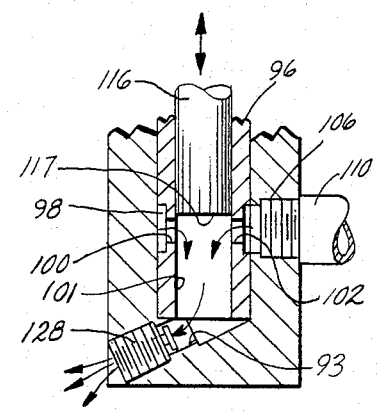
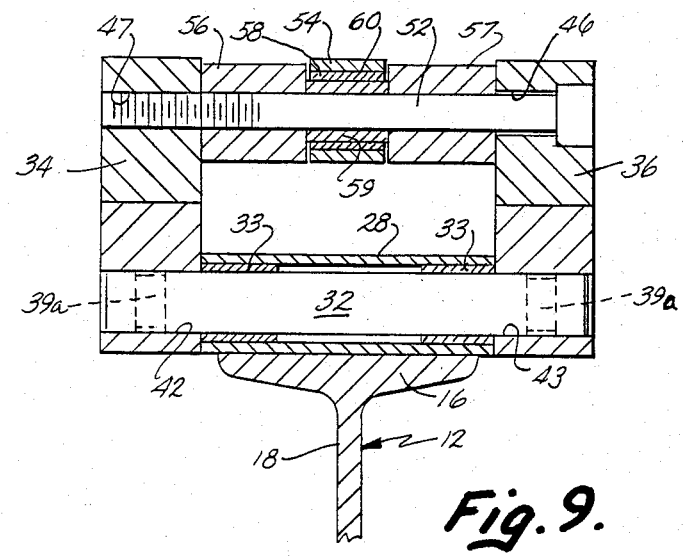

CONVEYOR AND/OR CHAIN LUBRICATION APPARATUS

BACKGROUND OF THE INVENTION

Lubrication equipment for conveyor apparatus including overhead conveyors using trolley wheel and bracket assemblies as well as conveyor chains is well known. Typical arrangements include an oiling nozzle or ejection apparatus in a fixed position adjacent a chain or conveyor connected to a trigger or other conveyor engaging apparatus at a different location which is designed to trip or actuate the oil ejection apparatus to spray the conveyor apparatus with oil or other lubricant. Both pressurized and nonpressurized systems are known. See for instance U.S. Pat. Nos. 3,543,882 to J. A. Paasche and 3,503,470 to C. D. Lister which illustrate lubrication devices of this type.

Other lubrication or oiling equipment has combined the lubrication and chain engaging apparatus at a single location by providing tubes or spraying devices immediately adjacent the chain or conveyor and a moveable member adapted to be engaged by the conveyor to actuate the spraying operation as the conveyor moves past the lubrication point. Examples of this type of apparatus include U.S. Pat. No. 1,990,408 to E. B. Kerst et al, British No. 4,457,899 of 1936 to J. Bliss, and British No. 613,221 of 1948 to Tecalemit Limited, et al.

The majority of these structures have been designed for lubrication of conveyor or chain apparatus while that apparatus is moving. Certain of these known structures have been more effective because of more precise direction of the oil or lubrication fluid to the critical wear areas of the apparatus being lubricated. In these structures, the lubricant direction apparatus is positioned quite close to the apparatus being lubricated. However, such close positioning of the lubricant apparatus for proper lubrication subjects that apparatus to a risk of damage due to worn or damaged structural parts of the conveyor or chain which might come in contact with the lubrication apparatus.

For instance, it is quite common in overhead trolley wheel conveyors for a trolley bracket or other wheel support device to become bent from its normal position due to excessive or abnormal loadings, or engagement with an obstacle along the path of the conveyor. In such cases, the bracket and associated trolley wheel might be bent outwardly away from the web of the supporting I-beam track and could engage, bend or break the stationary lubrication apparatus, or alternately become jammed in the apparatus causing damage to the overall conveyor and consequent disruption in conveyor operation.

Accordingly, a need has become apparent for lubrication equipment for conveyor apparatus and/or chain apparatus which will provide proper and adequate lubrication or oiling of critical conveyor or chain wear areas without waste or excessive spillage or dripping, accomplish the lubrication while the conveyor is in motion, and yet be capable of preventing damage to either the lubrication apparatus or conveyor apparatus should a damaged or mispositioned conveyor or chain part engage the lubrication equipment.

SUMMARY OF THE INVENTION

The present invention provides lubrication apparatus for conveyor equipment and/or chains, especially overhead conveyor systems using trolley wheel and bracket assemblies and conveyor chains. The apparatus is adapted for mounting immediately adjacent the conveyor or chain for precise and proper lubrication of high wear areas of that apparatus while the conveyor or chain is moving. Provision is made for pivotal movement of the lubrication apparatus out of the path of the conveyor or chain should a damaged or mispositioned conveyor or chain part contact the lubrication apparatus.

In one form, lubrication apparatus for lubricating a moving conveyor apparatus is provided including elongated central arm means for contacting a moving conveyor apparatus and a pair of elongated, spaced arm means adjacent opposing sides of the conveyor apparatus. The spaced and central arm means each have first and second ends spaced from one another. Directing means for directing lubricant onto opposing portions of the conveyor apparatus while the conveyor apparatus is moving are provided in the first end of each spaced arm. Mounting means extend between the second ends of the spaced arm means and the second end of the central arm means for pivotally mounting the central arm means generally parallel and intermediate the spaced arm means. The central arm means also include engaging means at its first end for contacting the conveyor. Further, metering means are internally mounted within each of the spaced arm means and are simultaneously actuated by the central arm means for supplying a predetermined quantity of lubricant to the directing means for directing lubricant onto the conveyor apparatus. Biasing means for urging the engaging means of the central arm means into contact with the conveyor apparatus are included such that, contact of the engaging means with a portion of the conveyor apparatus causes pivotal movement of the central arm means out of the path of that conveyor portion and simultaneously actuates the metering means to measure and supply lubricant to said directing means which direct the lubricant onto predetermined opposing portions of the conveyor apparatus while the conveyor apparatus is moving.

In other forms of the invention, mounting means for pivotally mounting both the central arm means and the spaced arm means with respect to one another and the conveyor apparatus are provided, while the biasing means urges the central arm means into contact with the conveyor apparatus and the spaced arm means into a lubricating position. If the conveyor somehow contacts the spaced arm means, the spaced and central arm means are pivoted in unison out of the path of the moving conveyor.

In preferred embodiments of the invention, the spaced arm means include side arms adjacent opposite sides of the conveyor or chain to be lubricated including internal lubricant passageways and metering pumps which are reciprocated by the motion of the pivotal central arm when contacted and lifted by the moving conveyor or chain apparatus. The pivotal mounting of the side arms and central arm may be accomplished by spaced, parallel pivot axes or by mounting all of those arms on a common pivot axis. Means for properly positioning the conveyor apparatus to contact the lubrication apparatus may also be provided.

As will be appreciated, the present invention allows precise and proper lubrication of moving conveyor equipment yet avoids damage to either that equipment or the lubrication apparatus itself via pivotal mounting of the lubrication apparatus. All of this is accomplished with a cost-efficient, durable apparatus designed for ease of maintenance and long life and yet which may be adjusted to fit varying types of conveyors or conveyor apparatus.

These and other objects, advantages, purposes and features of the invention will become more apparent from a study of the following description taken in conjunction with the drawings.

BRIEF DESCRIPTION OF THE DRAWINGS

FIG. 4 is a partial side elevation of the conveyor lubrication apparatus shown in FIGS. 1-3;

FIG. 5 is a plan view of the conveyor lubrication apparatus shown in FIGS. 1-4;

FIG. 8 is a sectional view of the conveyor lubrication apparatus of FIGS. 1-7 taken through the metering pumps along line VIII—VIII of FIG. 4;

FIG. 8A is a fragmentary, enlarged sectional view of one of the metering pump and ejection nozzle areas of FIG. 8;

FIG. 8B is an enlarged, sectional side elevation of the check valve ejection nozzle shown in FIGS. 8 and 8A;

FIG. 9 is a sectional view of the two pivot axes in the conveyor lubrication apparatus of FIGS. 1-8 taken along line IX—IX of FIG. 4;

DESCRIPTION OF THE PREFERRED EMBODIMENTS

Figure 1:
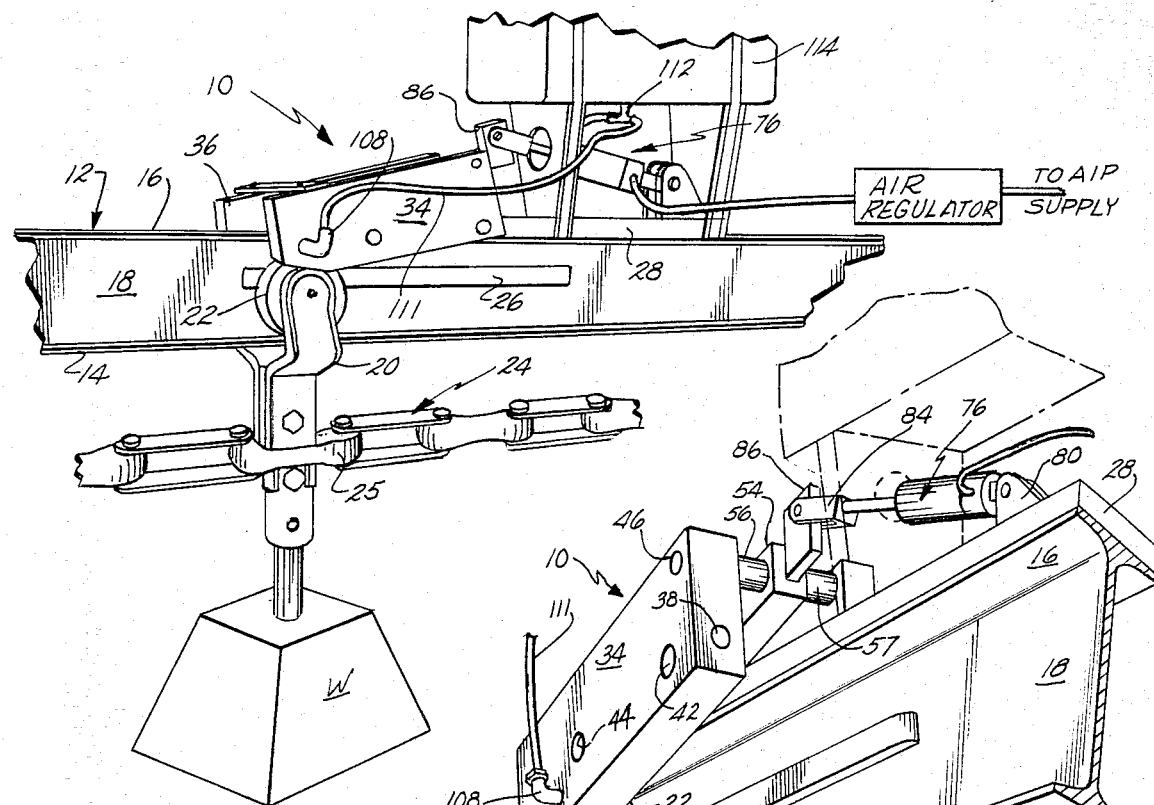
FIG. 1 is a fragmentary, perspective view of a first embodiment of the conveyor lubrication apparatus of the present invention as mounted on a conventional overhead conveyor system including overhead conveyor trolley wheel and bracket assemblies.
Figure 3:
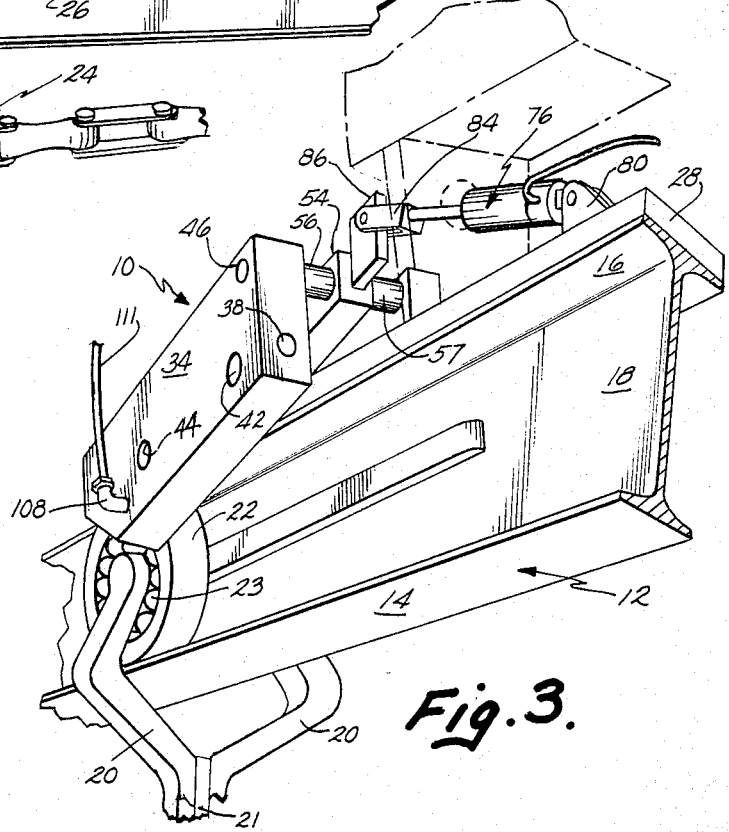
FIG. 3 is a perspective view of the upstream end of the lubrication apparatus shown in FIGS. 1 and 2.
Figure 2:
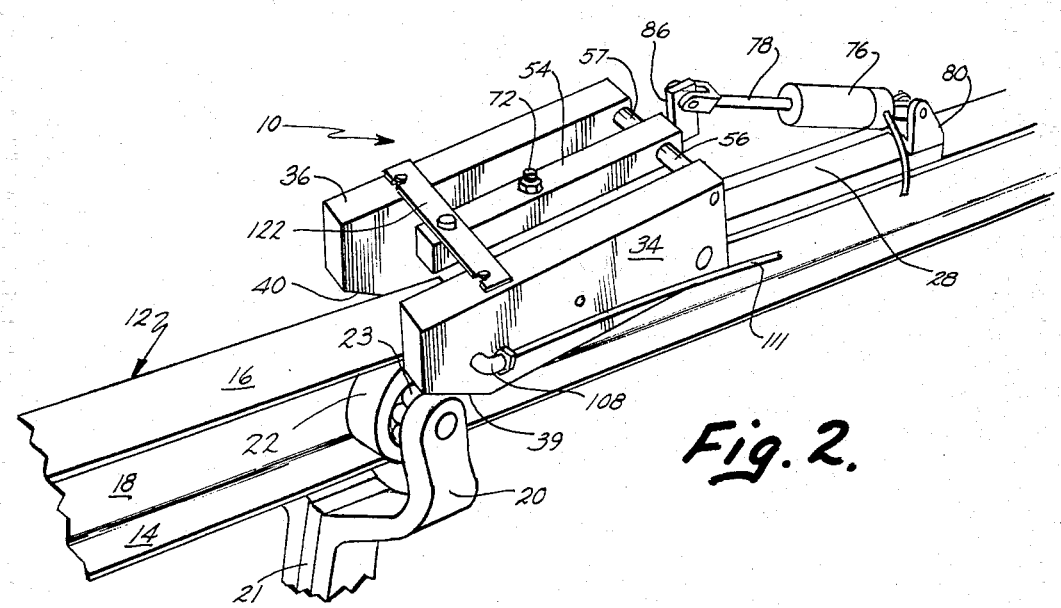
FIG. 2 is a perspective view of the lubrication apparatus shown in FIG. 1 taken from a slightly differing angle.

Referring now to the drawings in greater detail, FIGS. 1-9 illustrate a first embodiment of the conveyor lubrication apparatus of the present invention. Embodiment 10 is especially adapted for use with overhead conveyors including trolley wheel and trolley bracket assemblies. Generally speaking, such systems include an I-beam type overhead conveyor support track 12 having a lower trolley support flange 14, and upper flange 16, and an intermediate or central web 18. As shown in FIGS. 1-3, the suspended conveyor system includes a series of pairs of stamped or forged trolley brackets 20 bolted together with a spacer attachment 21 therebetween, each bracket including an inwardly facing trolley wheel assembly 22 adapted to roll on the downwardly and outwardly sloped upper surface of flange 14 of I-beam track 12. Each pair of trolley brackets 20 and attachment 21 is engaged with a center link 25 of a conventional X-type conveyor chain 24 or other chain which surrounds the assembled pair of trolley brackets and moves the trolley brackets with the chain which is driven by a drive structure not shown. As shown in FIG. 1, the trolley bracket and trolley wheel assemblies support both the conveyor chain 24 which drives the trolley assembly along the I-beam 12 as well as a suspended workpiece shown, for example, at W.

Figure 7:
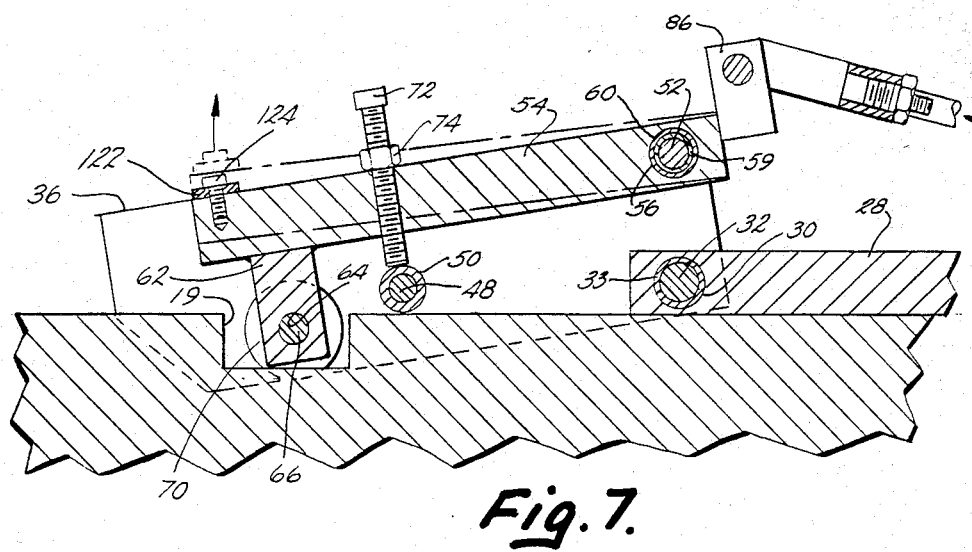
FIG. 7 is a sectional side elevation of the conveyor lubrication apparatus of FIGS. 1-6 taken along line VII—VII of FIG. 6.

As shown in FIGS. 1-3, the conveyor lubrication apparatus 10 is adapted to be mounted atop the upper flange 16 of I-beam track 12 adjacent a small cutout 19 in the upper portion of the track (FIGS. 4 and 7). Cutout 19 provides an entry area for receipt of the wheels secured to the lubrication apparatus which are engaged by the moving conveyor, as will be explained more fully below. As is best shown in FIGS. 1, 3 and 4, a pair of guide bars 26 are welded or otherwise secured on either side of the web 18 and extend parallel to flanges 14, 16 of track 12. Guide bars 26 contact the inside surfaces of those trolley wheel assemblies 22 which are not centered on track 12 to position the wheels outwardly by a camming action into a centered, spaced relationship with respect to the central web 18 of track 12 and lubrication apparatus 10 so that trolley wheel assemblies 22 will make proper engagement with the lubrication apparatus as explained hereinafter.

As shown in FIGS. 3 and 4, lubrication apparatus 10 is secured to top flange 16 of track 12 via a base block 28 which is welded or otherwise secured to the planar top surface of the track. Base block 28 includes a transverse bore or aperture 30 (FIGS. 7 and 9) extending through its forward end for receiving a pivot shaft 32 within hardened steel bushings or needle bearings 33. Shaft 32 pivotally supports spaced, side or oiler arms 34, 36. Shaft 32 is secured in position through base block 28 and arms 34, 36 by set screws 38 received through the rear surface of arm 34, 36 and engaging annular grooves 39a formed on shaft 32.

Figure 7A:
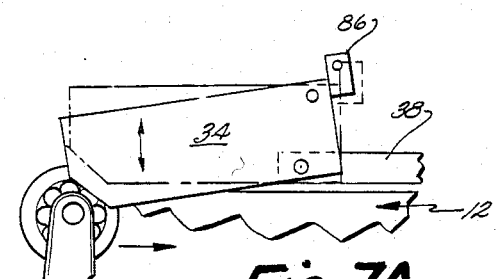
FIG. 7A is a schematic illustration of the pivotal movement of the entire conveyor lubrication apparatus to avoid damage.
Figure 6:
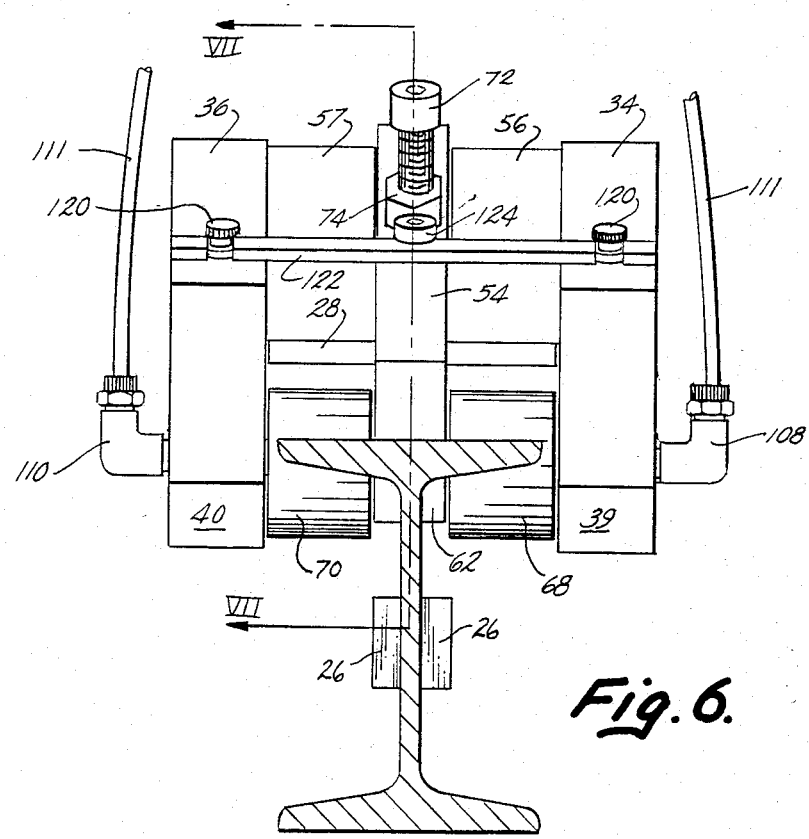
FIG. 6 is an end elevation of the conveyor lubrication apparatus of FIGS. 1-5 as mounted on an overhead conveyor I-beam support track taken from the downstream end of the apparatus.

Spaced side or oiler arms 34, 36 are elongated and rectangular and are preferably formed from steel blocks which are mirror images of one another. Each side arm is truncated at its lower, downstream corner forming beveled or angled surfaces 39, 40 to provide clearance room for the conveyor apparatus to pass the side arms. In addition, as shown in FIG. 7A, beveled or angled surfaces 39, 40 cause side arms 34, 36 to be cammed up and over and thus out of the path of the upper ends of trolley brackets 20 from their usual lubricating position (in solid in FIG. 7A) to a non-lubricating position (in phantom in FIG. 7A) to prevent damage to the lubrication apparatus 10 or the conveyor itself in the event the conveyor should somehow be run in a reverse direction.

Each side arm also includes three transverse bores or apertures 42 or 43, 44 or 45, and 46 or 47. Apertures 42, 43 (FIGS. 5 and 9) receive the ends of shaft 32 for pivotally mounting the side arms with respect to base block 28, as mentioned above. Aperture 45 is threaded and receives the threaded end of a cap screw 48 received through aperture 44 which rigidly interconnects the side arms 34, 36. Cylindrical tubular bushing or stop 50 is telescoped over screw 48 to space the side arms apart such that they are parallel to one another. Bushing 50, together with cap screw 48, forms a rigid member or bar which also provides a stop which engages the top of I-beam track 12 (FIG. 7) to limit the downward pivotal movement of the side arms with respect to the conveyor apparatus. Likewise, aperture 47 (FIG. 9) is threaded to receive the threaded end of a cap screw pivot shaft 52 received through aperture 46 to interconnect the upper rear corners of the side arms 34, 36 and provide a pivotal mounting for the central actuator arm 54 as will be described more fully below.

As shown in FIGS. 2, 5, 6, 7 and 9, an elongated rectangular actuator arm 54, preferably formed from steel, is pivotally mounted in a central position intermediate side arms 34, 36. Actuator arm 54 is spaced between the side arms by tubular spacer members 56, 57 which are telescoped over cap screw pivot shaft 52 as it is placed in position. A bronze bushing 58 and/or a hardened steel bushing 59, or, alternatively, a conventional needle roller bearing and a hardened steel inner race, are telescoped one within the other and over cap screw pivot shaft 52 within bore or aperture 60 in central arm 54 to pivotally mount same between spacer members 56, 57 on cap screw pivot shaft 52. Accordingly, as best seen in FIG. 7, central actuator arm 54 is pivotally mounted for rotation around cap screw pivot shaft 52 which is mounted on side arms 34, 36. The plane of rotation is parallel to the planes of rotation of side arms 34, 36 about shaft 32 since pivot axes 32, 52 are parallel. However, as shown in FIG. 7A, and as will be more fully described below, pivotal movement of rigidly interconnected side arms 34, 36 will also cause simultaneous movement of central actuator arm 54 in unison therewith.

Projecting below the downstream end of central actuator arm 54 is wheel support flange 62 through which extends a bore or aperture 64 receiving wheel support axle 66. Axle 66 is press-fitted in aperture 64 and has a length just short of the inside surfaces of side arms 34, 36 to fully support rotatable conveyor apparatus engaging wheels 68, 70 which are rotatably mounted on axle 66. No external retainer on axle 66 for wheels 68, 70 is necessary since they are held captive by the inside surfaces of side arms 34, 36 and cannot move off the ends of the axle. Wheels 68, 70 project below flange 62 on central actuator arm 54 in order to properly engage and be in position to be lifted by the trolley wheels of the moving overhead conveyor apparatus, as will be explained below.

Pivotal movement of central actuator arm 54 downwardly toward conveyor track 12 is limited by the extension of stop bolt 72 which is received in a threaded bore extending vertically through the central arm 54 for engagement with the rigid member or bar formed by stop bushing 50 received on shaft 48. Bolt 72 may be extended or withdrawn to determine the rest position of the central arm 54 and locked in place by lock nut 74. Thus, central arm 54 may be raised or lowered which controls the amount of downward movement of pistons 116, 118 which, in turn controls the volume of lubricant to be dispensed. As mentioned above, the position of side arms 34, 36, as well as central arm 54, is determined by the engagement of bushing 50 with the top surface of top flange 16 of the I-beam track. These stops are spaced from the pivot axes 32, 52 for proper leverage.

Referring now to FIGS. 2-5 and 7, the pivotally movable side arms and central arm are biased into a lubrication position adjacent the conveyor apparatus by means of an air pressure cylinder 76 which functions as an air spring. Cylinder 76 is a spring return air cylinder such as that manufactured under Part No. 5-SP, by Humphrey Products of Kalamazoo, Mich., and includes a movable piston connected to extending piston rod 78. Although mechanical springs could be substituted for cylinder 76, cylinder 76 is preferred because it is more easily shut off and/or controlled. When pressurized air, typically at 40 to 60 psi, is connected to the rear portion of the cylinder, as shown in FIG. 1, from a pressurized air supply and preferably through an air pressure regulator, the piston rod 78 is urged outwardly. As shown in FIGS. 4 and 5, the rear of air cylinder 76 is pivotally connected by pivot pin 82 to an upstanding pivot bracket 80 which forms a stop bolted to the upstream end of base block 28. Extensible piston rod 78, extending from the opposite end of air cylinder 76, receives a U-shaped clevis 84 which in turn is pivotally secured by clevis pin 88 to upstanding flange 86 welded to the upstream end of central actuator arm 54. As shown in FIGS. 4 and 7, flange 86 projects above and to the upstream side of arm 54 such that the pivot point is positioned for proper leverage and biasing force on arm 54 and, in turn, on side arms 34 and 36. When air pressure is received in the cylinder, piston rod 78 is urged outwardly via a piston within the cylinder which, in turn, biases the side and central arms toward the conveyor about pivot axes 32, 52. In the preferred embodiment 10, pivot 88 is positioned with respect to pivots 32 and 52 such that the force from cylinder 76 on the side arms as compared to the cylinder force on the center arm is in a ratio of about 10 to 1. Thus, with 40 to 60 psi air pressure in cylinder 76, the force necessary to raise the side arms is about 60 pounds while that necessary to raise the center arm is about 6 pounds.

Referring now to FIGS. 2, 5, 7, 8 and 8A, the lubricant direction structure incorporated in side arms 34, 36 will be understood. As shown in FIG. 8, each side arm 34, 36 includes a lubricant bore 90, 92 which extends transverse to the direction of extension of bores 42, 43, 44, 45 and 46, 47 passing through these side arms. Received within bores 90, 92 are tubular oil or piston bushings 94, 96 which are preferably formed from aluminum and include an annular, circumferential recess 98 adjacent their bottom ends. Oil inlet bores 100, 102 are provided at opposing positions through annular recess 98 to the inside surface of the piston bushings 94, 96, as shown in FIG. 8A. Aligned in registry with the annular recess 98 of each piston bushing when telescoped and press fitted within bores 92, 94 are threaded oil inlet apertures 104, 106 receiving L-shaped oil inlet pipe fittings 108, 110. Fittings 108, 110 are, in turn, connected through flexible tubing 111 to a T-connection 112 at the bottom of an oil reservoir or tank 114 (FIG. 1). Oil is fed by gravity through tubes 111, through fittings 108, 110 and, hence, to piston chambers 101 (FIG. 8A) formed by the interiors of piston bushings 94, 96 through recesses 98 and openings 100, 102.

Telescopically received for reciprocation within piston chambers 101 of piston bushings 94, 96 are cylindrical pistons 116, 118 which are identical to one another. Each piston includes a planar bottom end 117, a recessed, reduced diameter neck 119 and a head or top flange 120. Pistons 116, 118 are designed to reciprocate within the piston bushings are controlled and engaged by a rigid member, namely, rigid cross bar 122 which is secured to the top surface of central actuator arm 54 by bolt 124 or the like, as shown in FIGS. 4–8. The rigid cross bar 122 includes U-shaped recesses 126, 127 (FIG. 5) opening to one edge of the cross bar such that it may be slipped under the heads or top flanges 120 of pistons 116, 118 with necks 119 received in those recesses.

With reference to FIGS. 4 and 7, the operation of lubrication apparatus 10 will be understood. Flange 62 and wheels 68, 70 project downwardly into cutout 19 from arm 54 for engagement with the top of the outer circumference of trolley wheel assemblies 22. Trolley wheels 22 are centered by guide bars 26 so that wheels 68, 70 will be properly engaged. When central actuator arm 54 is pivoted upwardly by engagement of wheels 68, 70 with the leading portions of a pair of trolley wheel assemblies 22 of the conveyor apparatus, cross bar 122 is lifted, simultaneously lifting pistons 116, 118. Planar end surfaces 117 of the pistons are raised above oil inlets 100, 102 and the reduced pressure or suction created between the end of the piston and the bottom of bores 90, 92 draws the oil from fittings 108, 110 and lines 111 into the partially vacated piston chamber 101. Continued movement of trolley wheel assemblies 22 past wheels 68, 70 lowers central arm 54 and cross bar 122 which in turn lowers pistons 116, 118. The downward reciprocation of the pistons compresses and builds the pressure within the filled piston chamber 101 between the end of the piston and the bottom of the bore forcing the oil or other lubricant toward check-valve nozzles 128. As shown in FIG. 8B, check-valve nozzles 128 each include a slightly tapered, threaded body 220 such as a modified pipe plug having a cylindrical bore 222 at its smaller end and a hexagonal recess 224 in its larger end. A yet smaller bore 226 extends between bore 222 and recess 224. Press-fitted within bore 222 is a check-valve 228 having a valve body 229, an internal valve seat 230 and openings 232, 234 at opposite ends. A ball valve 236 is received within the interior bore 233 of check-valve 228 and is held against valve seat 230 by spring 238 retained by lip 240 which forms opening 234. A capillary tube 242 is received through bore 226, projects slightly into bore 222 and a greater distance into recess 224, and is secured in place by a quantity 244 of epoxy or other suitable cement or adhesive which also provides a fluid seal around the tube 242 within bore 226. Without tube 242, the oil would tend to dribble when forced by pistons 116, 118 out through the nozzle. Tube 242, however, helps retain some back pressure within the piston chamber 101 to maintain a fine, divided spray. Also, the overall length of tube 242 dispenses the spray in the intended direction. Nozzle 128 is inserted threaded bore 93 (FIGS. 8 and 8A) with a hex or allen wrench received in recess 224 having a bore in its end surface to provide clearance for tube 242. The spring-biased check valve 236 is unseated by the pressure created by the downward movement of pistons 116, 118. Upon the buildup of a predetermined pressure, typically 25 psi, the ball check valve is opened and the oil is forced through opening 232, bore 233, opening 234 and is sprayed and directed outwardly and downwardly toward the conveyor apparatus as shown in FIGS. 8 and 8A.

As shown in FIGS. 4 and 8 check-valve nozzles 128 are located immediately adjacent the beveled or angled surfaces 39, 40 on the inside surfaces of side arms 34, 36 so as to be properly positioned to direct lubricant onto the open side of the trolley wheel bearings. The check-valve nozzles 128 in bores 93 provide an exit portion from the piston chambers for the lubricant. The oil or other liquid lubricant is, in fact, directed in a fine spray toward the open bearings area or outer side of trolley wheel assemblies 22, i.e., directly onto the trolley wheel ball or roller bearings between the inner and outer races, such as in area 23 as shown in FIG. 3. Accordingly, little or no lubricant is wasted and a predetermined amount of lubricant is applied in a fine, narrowly directed spray, based on the movement of arm 54 and pistons 116, 118 which draws in a predetermined amount of lubricant and thereby acts as a metering device to control the amount of lubricant applied. The metering is controlled by the position of bolt 72. Thus, the trolley wheels are immediately adjacent the nozzles 128 as the conveyor engaging wheels 68, 70 roll down the backside of the trolley wheel circumferences and cause downward movement of the central arm 54, cross bar 122 and pistons 116, 118.

Figure 10:
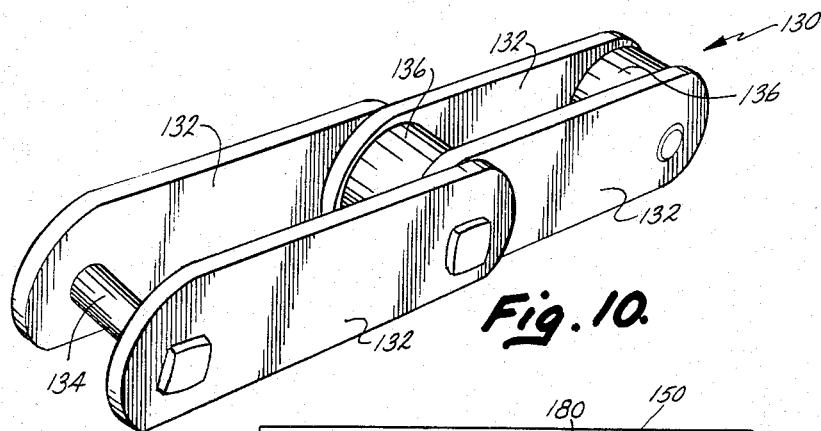
FIG. 10 is a perspective view of a roller conveyor chain suitable for lubrication by an embodiment of the present invention shown in FIGS. 11-15.

Referring now to FIGS. 10–15, a second embodiment 150 of the conveyor lubrication apparatus is illustrated along with a conventional form of conveyor chain designed to be lubricated by this form of the invention. More specifically, FIG. 10 illustrates two links from a conventional roller conveyor chain 130 which is widely used in the automotive industry in the United States. No claim to this chain is made as part of the present invention.

Figure 13:
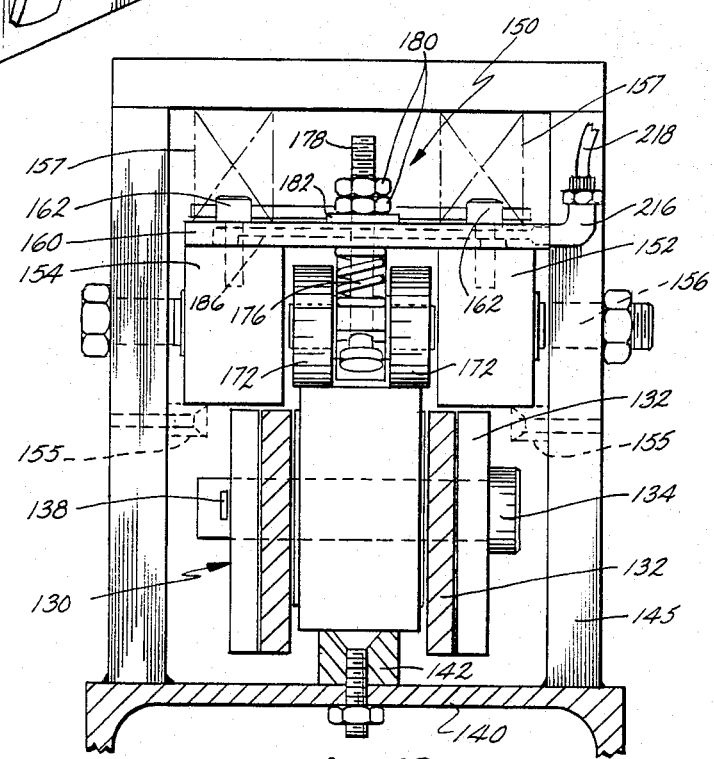
FIG. 13 is an end elevation taken from the downstream end of the lubrication apparatus shown in FIGS. 11 and 12.
Figure 14:
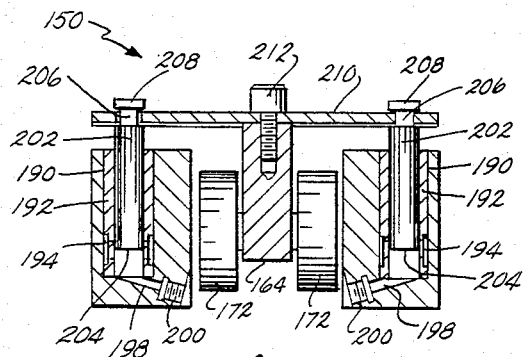
FIG. 14 is a sectional view of the conveyor chain lubrication apparatus taken along line XIV—XIV of FIG. 11.

As shown in FIG. 10, the chain 130 includes side links 132 which may be identical to one another and are pivotally fastened together adjacent their ends by means of chain pins 134 which operate as pivot axes. Links 132 are alternated one within the other and overlap such that chain pins 134 pivotally interconnect the links. The two side links 132 which are arranged inside the ends of the outer links 132 are spaced apart by a tubular spacing member and/or roller 136 which rotates about chain pin 134 to allow the chain to roll over support mechanisms as shown in FIG. 13. The chain pins are typically held in place by cotter keys 138 (FIGS. 11 and 13) or the like.

Chain 130 as illustrated in FIG. 10 is typically connected together to form an endless chain length and used in combination with a like endless chain length spaced laterally from it to form a conveyor system which may be mounted above, below or at floor level in an industrial plant. It is possible that the inside ends of chain pins 34, or the side links themselves, may support L-shaped or other brackets which extend between the two endless chain lengths to support slats or other conveyor structures therebetween. As shown in FIG. 13, an endless chain which does not support such slats is shown supported on its return flight, i.e., upsidedown, by a channel 140 and a rail 142 bolted to the channel for engaging and supporting the rollers 136 which roll therealong. Also shown in FIG. 13 is a support frame or superstructure 145 including upstanding support channels for securing the conveyor lubrication apparatus 150 in position above the return flight of the conveyor chain 130. Accordingly, as will be more fully explained below, conveyor lubrication apparatus 150 applies liquid lubricant to the critical wear areas of the chain 130 from its underside as the chain is returning along its return flight.

Figure 11:
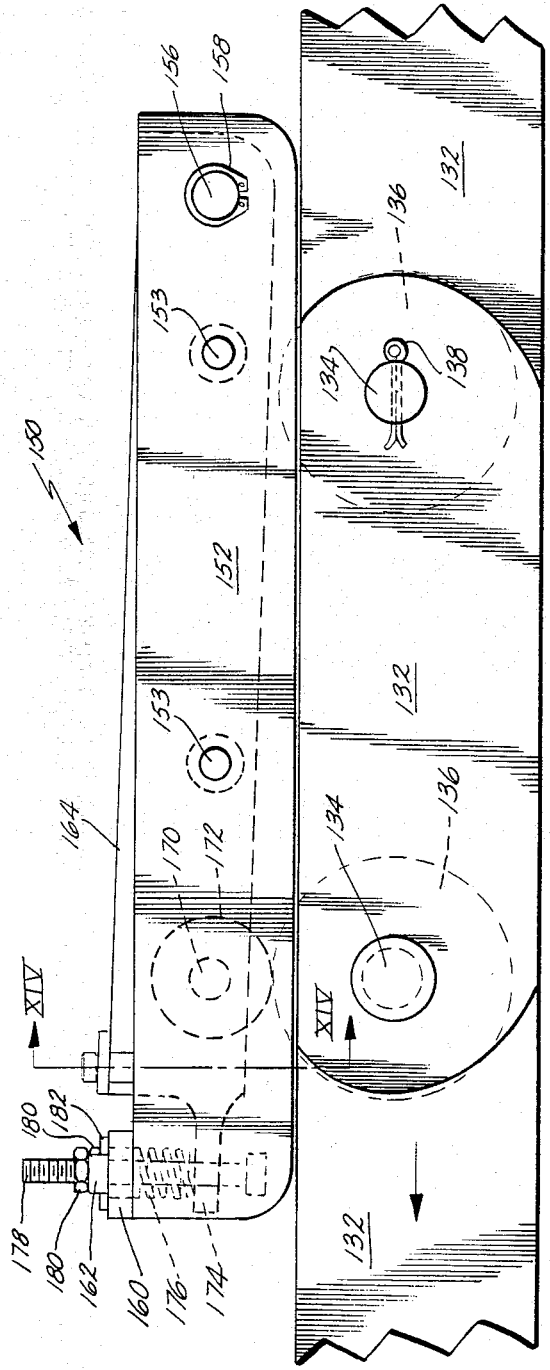
FIG. 11 is a side elevation of a second embodiment of the conveyor lubrication apparatus of the present invention adapted for use with the conveyor chain shown in FIG. 10.
Figure 12:
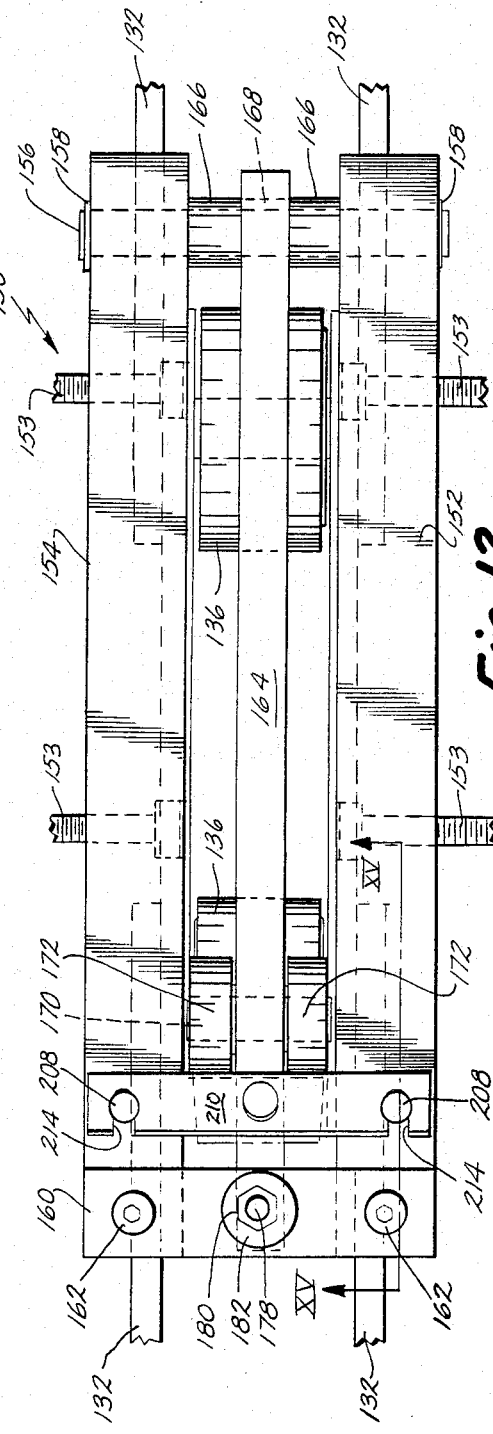
FIG. 12 is a plan view of the conveyor chain lubrication apparatus shown in FIG. 11.

Referring now to FIGS. 11-13, conveyor lubrication apparatus 150 is similar to embodiment 10 of the conveyor lubrication apparatus. Apparatus 150 includes spaced side or oiler arms 152, 154 pivotally mounted with respect to one another on cylindrical shaft 156 retained in place by split ring retainers 158. Side or oiler arms 152, 154 are rigidly secured together for movement in unison with one another by cross bar 160 extending transversely therebetween across the top surfaces of the arms at the ends thereof opposite shaft 156. Cross bar 160 is held in place by cap screws 162 and also provides an oil inlet function and a stop or a biasing spring mounting function to urge the lubrication apparatus toward the conveyor chain in addition to its rigid connection function.

Intermediate side arms 152, 154, is a central actuator arm 164 pivotally mounted on the same shaft 156 as are side arms 152, 154. Arm 164 is centered by tubular spacers 166 on either side thereof which engage the inside surfaces of arms 152, 154. In addition, shaft 156 extends through a hardened steel bushing 168 or a needle roller bearing telescoped over the shaft within the aperture through arm 164 (FIG. 12).

At the downstream end of central arm 164 opposite the end through which shaft 156 passes, is a second transverse aperture through arm 164 receiving a wheel support axle 170 on which are rotatably mounted chain engaging wheels 172. Wheels 172 are rotatably mounted on shaft 170 without retainers since, as was the case with side arms 34, 36 in embodiment 10 of the invention, the inside surfaces of side or oiler arms 152, 154 serve to retain the wheels 172 in place on shaft 170.

At the downstream end of central arm 164 is a portion or projecting flange 174 extending parallel to the central arm and providing a mounting area for biasing spring 176 which extends between the bottom surface of the cross bar 160 and the top surface of flange 174 to urge central arm 164 downwardly into engagement with the conveyor chain 130. Spring 176, which could also be a small air cylinder as described in embodiment 10, is held in place by a spring retainer formed by stop bolt 178 passing through flange 174 and cross bar 160. Bolt 178 is retained by lock nuts 180 countertightened against one another and passes through a washer 182 serving as a stop against which nuts 180 engage. As will be appreciated, the adjustable position of lock nuts 180 determines the downward extent to which central arm 164 can pivot toward the conveyor chain when lubrication apparatus 150 is mounted above and parallel to the chain as shown in FIG. 11 to control the volume of lubricant to be dispensed as described above in embodiment 10. Raising nuts 180 on the bolt 178 lowers the lowermost position of the central arm and vice-versa.

As in embodiment 10 of the invention, each of the side arms 152, 154 includes internal lubricant passageways through which lubrication oil is received and dispensed downwardly and outwardly of the arms toward the conveyor chain. With reference to FIGS. 12-15, each side arm 152, 154 includes an oil inlet passageway 184 leading from the top surface of the arm adjacent its downstream end under the area to which cross bar 160 is secured. As mentioned above, cross bar 160 includes an internal lubricant passageway 186 extending lengthwise therein and across from one arm to the other with downwardly opening apertures arranged in alignment and registry with the openings of internal lubricant passageways 184 when the cross bar is properly secured in position. A small O-ring 188 is positioned at the junction between cross bar 160 and the top surfaces of the oiler arms to prevent leakage through that joint. Passageway 184 extends downwardly and inwardly of the oiler arms to a lower area of an oil chamber bore 190 drilled vertically into the top surface of each oiler arm at a position adjacent the end of central arm 164. Press fitted within bore 190 in each arm is an aluminum or other machined oil bushing or piston receiving tube 192. Piston bushings 192, 192 each have an annular recess 194 in registry with the end of passageway 184 and two openings 196 through the annular recess 194 to the interior of the piston tube forming oil inlets at the lower end of the piston tube. After passing through annular recess 194 and oil inlets 196, the oil passes to the bottom of the piston chamber into passageway 198 and is expelled or dispensed in a fine directed spray through a check-valve nozzle 200 of the type described above at 128 in connection with embodiment 10.

Mounted reciprocally within piston tubes 192 are cylindrical pistons 202 having planar bottom surfaces 204, reduced diameter annular neck areas 206, and heads 208. Pistons 202 are connected to central arm 164 for simultaneous reciprocal sliding movement within their piston chambers by a second rigid cross arm 210 secured to the top surface of central arm 164 via a cap screw 212. As shown in FIG. 12, cross arm 210 has elongated recesses 214 opening toward one edge thereof for sliding receipt of the reduced diameter neck areas 206 of pistons 202 and engagement under heads 208.

As will now be understood, embodiment 150 of the lubrication apparatus operates similarly to embodiment 10. Spring 176 biases central arm 164 downwardly such that wheels 172, which extend below the lower surface of arm 164, engage rollers 136 of chain 130. The movement of chain 130 past the lubrication apparatus 150 (in the direction of the arrow in FIG. 11) causes wheels 172 to roll up rollers 136, i.e., out of the path of rollers 136, to the raised position shown in FIG. 11 against the biasing force up spring 176. Such movement raises pistons 202 via cross arm 210 such that the lower surfaces 204 of the pistons are raised above oil inlets 196 thereby reducing the pressure within the piston chamber in the open area. Such action draws oil from an appropriate reservoir (not shown) through oil inlet fitting 216 and tube 218 (FIG. 13) through passageway 186 in cross bar 160, downwardly past O-rings 188, into passageway 184, annular recess 19 and inlets 196. As wheels 172 roll down the backside of chain rollers 136, central arm 164 is pivoted downwardly as biased by spring 176 forcing pistons 202 downwardly in their chambers and expelling the lubricant outwardly through passageway 198 and check-valve nozzle 200 when a predetermined pressure has been surpassed. The nozzles 200 are located downstream of the location of the wheels 172 on central arm 164 so that there is no obstacle to the direct application of the fine lubricant spray to the critical wear areas of chain 130, namely, the areas between rollers 136 and side links 132 and chain pin 134.

Figure 15:
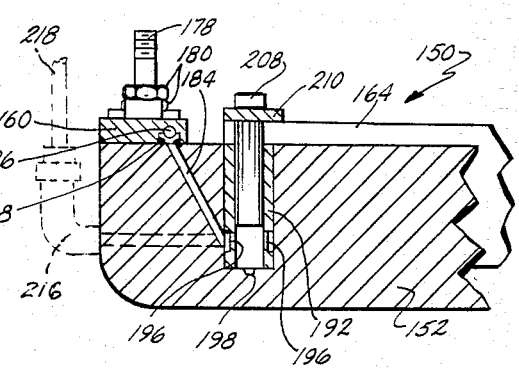
FIG. 15 is a fragmentary sectional elevation through the metering pump means in one of the side arms of the conveyor chain lubrication apparatus of FIGS. 11-14 taken along line XV—XV of FIG. 12.

As will be understood from FIG. 15, it is also possible to provide separate oil inlets for each side arm 152, 154 as shown in phantom in that figure. In such case, two oil inlet fittings 216 and two tubes 218 would be provided with an oil passageway bored directly into the piston bore 190 as shown. Such an arrangement would eliminate the need to cross drill cross arm 160 and avoid the necessity of accurate registry of the apertures from passageway 186 to internal passageway 184.

As will be noted from FIG. 13, conveyor lubrication apparatus 150 is typically mounted over the underside of the return flight of conveyor chain 130 by means of frame 145 through which pivot shaft or bolt 156 may be extended for support. Such an arrangement would allow central arm 164 as well as side arms 152, 154 to pivot both toward and away from, i.e., into and and out of the path of, chain 130. Such an arrangement also allows, however, the stationary attachment of side arms 152, 154 by securing those arms through appropriate outwardly extending bolts or cap screws 153 (FIGS. 11 and 12) in arms 152, 154 which hold the arms in a fixed position and prevent their pivotal movement around shaft 156. When attaching bolts 153 are used, the central arm 164 would be the only pivotal arm and would operate by engagement with the chain rollers as noted above.

Alternately, as shown in FIG. 13, stop blocks 155 may be bolted to frame 145 beneath arms 152, 154 to limit downward pivotal movement of the side arms. In such case, additional biasing springs 157 are positioned between frame 145 and the upper surfaces of arms 152, 154 to hold the arms against blocks 155 and help prevent undesired movement when wheels 172 contact the chain 130. Typically, spring 176 helps support crossarm 210 and side arms 152, 154 above the chain when wheels 172 engage the chain. In some situations, such as when blocks 155 are positioned below the upper edge of the chain links 132, the underside of the side arms can ride on the edges of the chain side links 132 when wheels 172 do not engage rollers 136. Thus, when stop blocks 155 and springs 157 are used, as was the case with embodiment 10 of the invention, should chain 130 become damaged and portions of the links become raised above their normal position as shown in FIG. 11, contact of such damaged side links with the underside of arms 152 and/or 154 would cause a resultant upward pivotal movement of all three arms 152, 154 and 164 about shaft or bolt 156 in unison from the normal, lubricating position out of the path of the conveyor chain to a non-lubricating position preventing damage to both the conveyor and the lubrication apparatus 150. Accordingly, it will be understood that the mounting structure shown in FIG. 13 is susceptible of allowing pivotal movement of all three arms or only the central arm depending on the stop or attaching structures provided.

Generally, the various parts of conveyor lubrication apparatus embodiments 10 or 150 may be formed from steel or other metallic materials. However, it is also possible to use certain plastic materials such as ultra high molecular weight polyethylene for higher wear portions such as wheels 68, 70 or 172. In addition, it is preferred that piston or oil bushings 196 and 192 be formed from hard, anodized aluminum tubing.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. Lubrication apparatus for lubricating a moving conveyor apparatus comprising:
    lubricant direction means adapted to be positioned adjacent a moving conveyor apparatus for directing lubricant onto the conveyor apparatus;
    means on said lubricant direction means for contacting the conveyor apparatus;
    engaging means separate from said lubricant direction means and adapted to be positioned adjacent the conveyor apparatus to be lubricated for engagement therewith;
    pump means actuated by said engaging means for pumping lubricant through said lubricant direction means and onto the conveyor apparatus;
    mounting means for pivotally mounting both said lubricant direction means and engaging means for simultaneous pivotal movement out of the path of the conveyor apparatus when necessary and in response to contact by the moving conveyor apparatus with said means on said lubricant direction means to avoid damage to either the conveyor apparatus or said lubrication apparatus;
    base means for securing said lubrication apparatus to the conveyor apparatus;
    said mounting means including first pivot means for pivotally mounting said engaging means to said lubricant direction means, and second pivot means for pivotally mounting said lubricant directing means to said base means, said first pivot means being spaced from said second pivot means; said second pivot means allowing said simultaneous pivotal movement of both said lubricant direction means and engaging means when said means on said lubricant direction means contact the moving conveyor apparatus.

2. The lubrication apparatus of claim 1 wherein said lubricant direction means include a pair of spaced, rigid side arms having internal lubricant passageways therein for directing lubricant onto the conveyor apparatus; a rigid member connecting said side arms for causing simultaneous movement thereof when pivoted; said engaging means including a rigid actuator arm positioned between said side arms and including at least one rotatable wheel for engaging the conveyor apparatus and lifting said actuator arm; said first pivot means including a pivot axis for pivotally mounting said actuator arm with respect to said side arms.

3. The lubrication apparatus of claim 2 including first stop means for limiting pivotal movement of said side arms with respect to said conveyor apparatus; and second stop means for limiting pivotal movement of said actuator arm with respect to said side arms.

4. The lubrication apparatus of claim 2 including biasing means for urging said side arms and actuator arm in one pivotal direction toward a lubrication position with respect to the conveyor apparatus.

5. The lubrication apparatus of claim 4 wherein said pump means include a piston chamber in each of said side arms, a reciprocable piston in each of said piston chambers, and a lubricant inlet adapted for connection to a source of lubricant to provide lubricant to each of said piston chambers.

6. The lubrication apparatus of claim 5 including a cross bar connecting said actuator arm with each of said reciprocable pistons for moving said pistons with said actuator arm.

7. A lubrication apparatus for lubricating a moving conveyor apparatus comprising:
  elongated, central arm means for contacting a moving conveyor apparatus, said central arm means having first and second ends spaced from one another;
  a pair of elongated, spaced arm means adapted for mounting adjacent opposing sides of the conveyor apparatus such that one spaced arm means will extend along each side of the conveyor apparatus, each of said spaced arm means including first and second ends spaced from one another and directing means at said first end of each of said spaced arm means for directing lubricant onto a portion of the conveyor apparatus which is opposed to another portion of the conveyor apparatus lubricated by the other spaced arm means while the conveyor apparatus is moving;
  first mounting means extending between the second ends of said spaced arm means and the second end of said central arm means for pivotally mounting said central arm means generally parallel to and intermediate said spaced arm means, said central arm means having engaging means at its first end for contacting the conveyor apparatus;
  metering means internally mounted within each of said spaced arm means and simultaneously actuated by said central arm means for supplying a predetermined quantity of lubricant to said directing means;
  biasing means for urging said engaging means of said central arm means into contact with said conveyor apparatus;
  base means for securing said lubrication apparatus to a conveyor apparatus;
  second mounting means for pivotally mounting said spaced arm means to said base means, said second mounting means being spaced from the first of said mounting means which pivotally mount said central arm means, said second mounting means including a pivot axis parallel to that of said first mounting means; and
  means on said spaced arm means for contacting the conveyor apparatus and causing pivotal movement of said spaced arm means and central arm means in unison out of the path of the conveyor apparatus about said second mounting means when said means for contacting on said spaced arm means are contacted by the conveyor apparatus;
  whereby contact of said engaging means of said central arm means with a portion of the conveyor apparatus pivots said central arm means out of the path of that conveyor portion and simultaneously actuates said metering means within each of said spaced arm means to measure and supply lubricant to said directing means which direct the lubricant onto predetermined opposing portions of the conveyor apparatus while the conveyor is moving.

8. The lubrication apparatus of claim 7 including first stop means for limiting pivotal movement of said spaced arm means with respect to said conveyor apparatus; and second stop means for limiting pivotal movement of said central arm means with respect to said spaced arm means.

9. The lubrication apparatus of claim 8 wherein said first stop means includes a rigid bar extending between and rigidly connecting said spaced arm means at a position spaced from said second mounting means; said second stop means including an adjustably positionable bolt extending through said central arm means into contact with said rigid bar.

10. The lubrication apparatus of claim 7 wherein said engaging means include rotatable wheel means for contacting and rolling over portions of the moving conveyor apparatus, said wheel means adapted to project below the conveyor apparatus portions so as to be lifted thereby.

11. The lubrication apparatus of claim 10 wherein said biasing means include a pressure air cylinder pivotally secured at one end to a stop on said base means and pivotally secured at its other end to a flange on said central arm means spaced above and toward said air cylinder from the first of said mounting means which pivotally mount said central arm means.

12. The lubrication apparatus of claim 10 wherein each of said spaced arm means is a side arm having said directing means therewithin, said directing means in each arm including a lubricant passageway for directing lubricant toward the conveyor apparatus.

13. The lubrication apparatus of claim 12 wherein said side arms each include angled surfaces adapted to contact the conveyor apparatus and cam said arms out of the path of the conveyor apparatus should the conveyor apparatus be operated in the reverse of its normal direction.

14. The lubrication apparatus of claim 12 wherein one of said lubricant passageways is internally located within each of said arms, each of said lubricant passageways having an exit portion for directing lubricant downwardly and generally toward the passageway in the other side arm.

15. The lubrication apparatus of claim 14 wherein said metering means include pump means for pumping lubricant through said internal lubricant passageways, said pump means being located in said side arms, said pump means being operably connected to said central arm means.

16. The lubrication apparatus of claim 15 wherein said pump means include a piston chamber in each of said side arms, a reciprocable piston in each of said piston chambers, and at least one lubricant inlet to each of said piston chambers to admit lubricant to said chamber from a source of lubricant.

17. The lubrication apparatus of claim 16 including a cross bar connecting said central arm means with each of said reciprocable pistons for moving said pistons with said central arm means.

18. The lubrication apparatus of claim 14 wherein said directing means further include nozzle means in said exit portion of said internal lubricant passageway in each of said side arms for directing said lubricant in a fine spray.

19. The lubrication apparatus of claim 18 wherein said nozzle means includes check-valve means for opening upon the application of a predetermined amount of pressure thereagainst and tube means for directing and spraying the lubricant.

20. The lubrication apparatus of claims 12, 14, 18 or 19 wherein said metering means is located within said lubricant passageway in each arm.

21. The lubrication apparatus of claims 7 or 10 wherein said biasing means include an air pressure cylinder pivotally connected between a fixed point adjacent said lubrication apparatus and said central arm means.

22. The lubrication apparatus of claim 7 or 10 wherein said biasing means include a spring and a spring retainer mounted between a cross bar extending between said spaced arm means and a portion of said central arm means.

23. The lubrication apparatus of claim 7 or 10 wherein said first mounting means include spacing means for retaining said central arm means centered between said spaced arm means.

24. The lubrication apparatus of claim 7 or 10 wherein said metering means include stop means spaced from said first and second mounting means for controlling the amount of lubricant dispensed by limiting pivotal movement of said central arm means toward the conveyor apparatus.

25. The lubrication apparatus of claim 24 including a bolt extending from said central arm means into contact with a rigid member extending between said spaced arm means.

26. The lubrication apparatus of claim 7 or 10 in combination with a conveyor support track and a pair of trolley brackets with a trolley wheel rotatably mounted on each of said brackets such that each of said trolley wheels as mounted on said brackets may roll along said track; said lubrication apparatus being mounted on top of said track with said central arm means having portions extending downwardly for contact with said trolley wheels; said guide means associated with said track for positioning and centering said trolley wheels on said track to cause proper engagement of said trolley wheels with said central arm means.

27. The combination of claim 26 wherein said track includes an I-beam type support track having upper and lower flanges and a central connecting web; said trolley wheels movably mounted on said lower flange; said guide means including a pair of camming bars secured to said central web of said track at the position of said lubrication apparatus for contacting the inside surfaces of said trolley wheels.

28. Lubrication apparatus for lubricating a moving conveyor apparatus comprising:
spaced arm means adapted to be positioned adjacent opposing portions of a moving conveyor apparatus and including directing means for directing lubricant onto opposing portions of the conveyor apparatus while the conveyor apparatus is moving;
central arm means intermediate said spaced arm means for contacting the conveyor apparatus;
metering means actuated by said central arm means for supplying a predetermined quantity of lubricant to said directing means;
mounting means for pivotally mounting said central arm means and spaced arm means with respect to one another and with respect to the conveyor apparatus, said central arm means being pivotally movable between at least first and second positions and said spaced arm means being pivotally movable between lubricating and nonlubricating positions;
said mounting means including means for pivotal movement of said spaced arm means and central arm means in unison out of the path of the moving conveyor apparatus when said spaced arm means are contacted by the moving conveyor apparatus;
said mounting means further including first and second spaced, parallel shaft means and a base member; said first shaft means extending between said spaced arm means and pivotally receiving said central arm means thereon; said second shaft means extending between said spaced arm means and pivotally engaging said base member;
biasing means for urging said central arm means into said first position for initial contact with the conveyor apparatus and said spaced arm means into said lubricating position;
whereby engagement of said central arm means with a portion of the moving conveyor apparatus pivots said central arm means out of the path of that conveyor portion to said second position and actuates said metering means, said means for pivotal movement of said spaced and central arm means enabling pivotal movement of both said spaced arm means and central arm means in unison out of the path of the engaged conveyor apparatus to said nonlubricating position if said spaced arm means are engaged by the conveyor apparatus.

29. Lubrication apparatus for lubricating a moving conveyor apparatus comprising:
spaced arm means adapted to be positioned adjacent opposing portions of a moving conveyor apparatus and including directing means for directing lubricant onto opposing portions of the conveyor apparatus while the conveyor apparatus is moving;
central arm means intermediate said spaced arm means for contacting the conveyor apparatus;
metering means actuated by said central arm means for supplying a predetermined quantity of lubricant to said directing means;
mounting means for pivotally mounting said central arm means and spaced arm means with respect to one another and with respect to the conveyor apparatus, said central arm means being pivotally movable between at least first and second positions and said spaced arm means being pivotally movable between lubricating and nonlubricating positions;
said mounting means including means for pivotal movement of said spaced arm means and central arm means in unison out of the path of the moving conveyor apparatus when said spaced arm means are contacted by the moving conveyor apparatus;
biasing means for urging said central arm means into said first position for initial contact with the conveyor apparatus and said spaced arm means into said lubricating position;
said biasing means including a spring and a spring retainer mounted between a cross bar extending between said spaced arm means and a portion of said central arm means; and
stop means positioned beneath at least one of said spaced arm means and additional spring means urging said spaced arm means against said stop means;
whereby engagement of said central arm means with a portion of the moving conveyor apparatus pivots said central arm means out of the path of that conveyor portion to said second position and actuates said metering means, said means for pivotal movement of said spaced and central arm means enabling pivotal movement of both said spaced arm means and central arm means in unison out of the path of the engaged conveyor apparatus to said nonlubricating position if said spaced arm means are engaged by the conveyor apparatus.

30. The lubrication apparatus of claim 28 or 29 wherein said biasing means include an air pressure cylinder pivotally connected between a fixed point adjacent said lubrication apparatus and said central arm means.

31. The lubrication apparatus of claim 28 or 29 including first stop means for limiting pivotal movement of said spaced arm means with respect to the conveyor apparatus; said metering means include second stop means for limiting pivotal movement of said central arm means with respect to said spaced arm means.

32. The lubrication apparatus of claim 28 or 29 wherein said central arm means include rotatable wheel means for contacting and rolling over portions of the conveyor apparatus, said wheel means adapted to project below the conveyor apparatus portions so as to be lifted thereby.

33. The lubrication apparatus of claim 32 wherein said spaced arm means include a pair of side arms positioned adjacent opposing sides of the conveyor apparatus, said directing means including a lubricant passageway in each of said side arms for directing lubricant toward the conveyor apparatus.

34. The lubrication apparatus of claim 33 wherein said side arms each include angled surfaces adapted to contact the conveyor apparatus and cam said arms out of the path of the conveyor apparatus should the conveyor apparatus be operated in the reverse of its normal direction.

35. The lubrication apparatus of claim 33 wherein one of said lubricant passageways is internally located within each of said arms, each of said lubricant passageways having an exit portion for directing lubricant downwardly and generally toward the passageway in the other side arm.

36. The lubrication apparatus of claim 35 wherein said directing means further include nozzle means in said exit portion of said internal lubricant passageway in each of said side arms for directing said lubricant in a fine spray.

37. The lubrication apparatus of claim 35 wherein said metering means include pump means for pumping lubricant through said internal lubricant passageways, said pump means being located in said side arms, said pump means being operably connected to said central arm means.

* * * * *

UNITED STATES PATENT AND TRADEMARK OFFICE
CERTIFICATE OF CORRECTION

PATENT NO.  : 4,506,763
DATED       : March 26, 1985
INVENTOR(S) : Charles C. Frost and Siegfried K. Weis It is certified that error appears in the above-identified patent and that said Letters Patent is hereby corrected as shown below:

Column 7, line 10:

"are" should be --as--

Column 7, line 23:

"Trolley wheels 22" (second occurrence in specification) should be --Trolley wheel assemblies 22--

Column 10, line 15:

delete "192,"

Column 10, line 55:

"19" should be --194--

Column 15, claim 26, line 31:

"said" (first occurrence) should be --and--

Signed and Sealed this

Fifth Day of August 1986

[SEAL]

Attest:

DONALD J. QUIGG

Attesting Officer  Commissioner of Patents and Trademarks